（12）United States Patent
Beumler

(10) Patent No.: US 9,469,084 B2
(45) Date of Patent: Oct. 18, 2016

(54) SHEET ENTITY AND AN AIRCRAFT FUSELAGE WITH A SHEET ENTITY OF THIS TYPE

(75) Inventor: Thomas Beumler, Jork (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/879,090

(22) PCT Filed: Sep. 27, 2011

(86) PCT No.: PCT/EP2011/066785
§ 371 (c)(1),
(2), (4) Date: Apr. 12, 2013

(87) PCT Pub. No.: WO2012/049021
PCT Pub. Date: Apr. 19, 2012

(65) Prior Publication Data
US 2013/0196121 A1 Aug. 1, 2013

Related U.S. Application Data

(60) Provisional application No. 61/392,512, filed on Oct. 13, 2010.

(30) Foreign Application Priority Data

Oct. 13, 2010 (DE) ........................ 10 2010 048 365

(51) Int. Cl.
B32B 7/04 (2006.01)
B32B 15/08 (2006.01)
(Continued)

(52) U.S. Cl.
CPC ............... B32B 7/04 (2013.01); B29C 70/088 (2013.01); B29C 70/30 (2013.01); B29C 70/885 (2013.01); B32B 5/26 (2013.01); B32B 15/08 (2013.01); B32B 15/14 (2013.01); B32B 15/20 (2013.01); B64C 1/068 (2013.01); B64C 1/12 (2013.01);
(Continued)

(58) Field of Classification Search
None
See application file for complete search history.

(56) References Cited

U.S. PATENT DOCUMENTS 5,160,771 A * 11/1992 Lambing ........... B29C 66/12821
428/189
5,866,272 A * 2/1999 Westre et al. .................. 428/593
7,959,058 B1 * 6/2011 Crane .................... B23K 9/167
228/120

(Continued)

FOREIGN PATENT DOCUMENTS

DE 102007046478 11/2008
DE 102007063608 11/2008

OTHER PUBLICATIONS

[NPL #1] C.A.J.R. Vermeeren, "The application of carbon fibers in ARALL Laminates, Report LR-658", (Sep. 1, 1991), TU Delft, Delft, Netherlands.*

(Continued)

Primary Examiner — David Sample
Assistant Examiner — Donald M Flores, Jr.
(74) Attorney, Agent, or Firm — Greer, Burns & Crain, Ltd.

(57) ABSTRACT

A sheet entity, in particular for use as a skin panel for an aircraft fuselage, with a carbon fiber-reinforced plastic laminate and an aluminum-based metal laminate in the edge region, which are connected with one another by means of an adhesive bond, and thereby are electrically insulated from one another, and are stepped back by layers. Also disclosed is a fuselage cell of an aircraft with at least one sheet entity of this type.

8 Claims, 2 Drawing Sheets

(51) Int. Cl.
  *B64C 1/06* (2006.01)
  *B29C 70/08* (2006.01)
  *B29C 70/30* (2006.01)
  *B29C 70/88* (2006.01)
  *B32B 5/26* (2006.01)
  *B32B 15/14* (2006.01)
  *B32B 15/20* (2006.01)
  *B64C 1/12* (2006.01)

(52) U.S. Cl.
  CPC ........ *B32B 2250/20* (2013.01); *B32B 2250/42* (2013.01); *B32B 2250/44* (2013.01); *B32B 2260/023* (2013.01); *B32B 2260/046* (2013.01); *B32B 2262/101* (2013.01); *B32B 2262/106* (2013.01); *B32B 2605/18* (2013.01); *Y02T 50/433* (2013.01); *Y10T 428/24752* (2015.01)

(56) References Cited

U.S. PATENT DOCUMENTS

| | | | |
|---|---|---|---|
| 2004/0256053 A1 | 12/2004 | Burpo et al. | |
| 2005/0048246 A1* | 3/2005 | Westre et al. | 428/57 |
| 2006/0162140 A1* | 7/2006 | Frauen et al. | 29/407.04 |
| 2008/0289747 A1* | 11/2008 | Modin et al. | 428/113 |
| 2008/0292849 A1* | 11/2008 | Stephan | 428/192 |
| 2009/0148647 A1 | 6/2009 | Jones et al. | |

OTHER PUBLICATIONS

C.A.J.R. Vermeeren, "The application of carbon fibres in ARALL Laminates, Report", Sep. 1, 1991.
International Search Report, Jan. 30, 2012.
Chinese Office Action, Feb. 28, 2015.
English Translation and Chinese Office Action dated Jul. 15, 2016 for PCT/EP2011/066785.

* cited by examiner

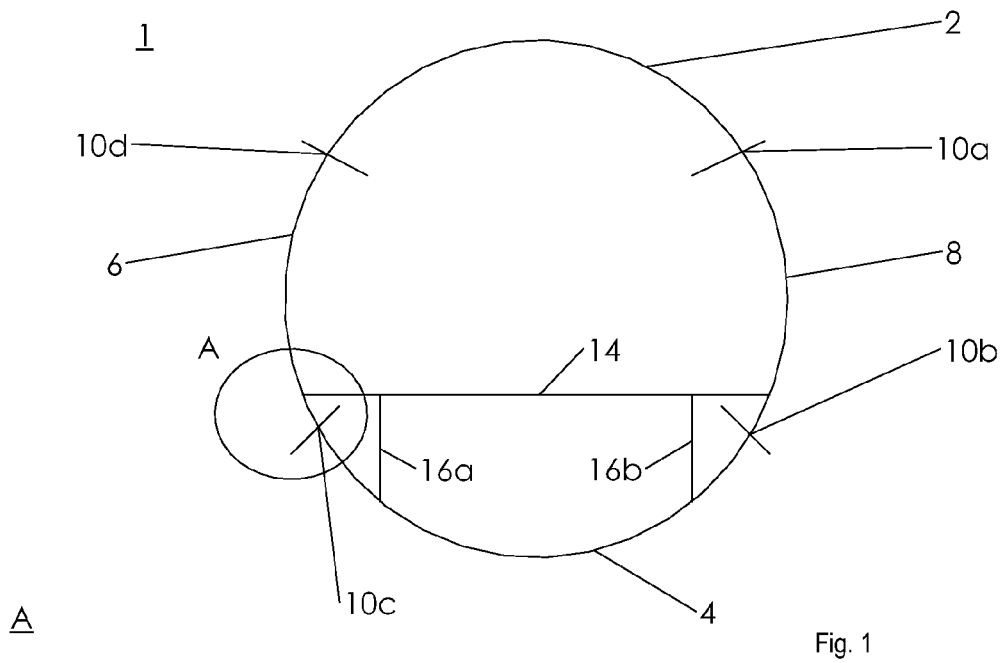
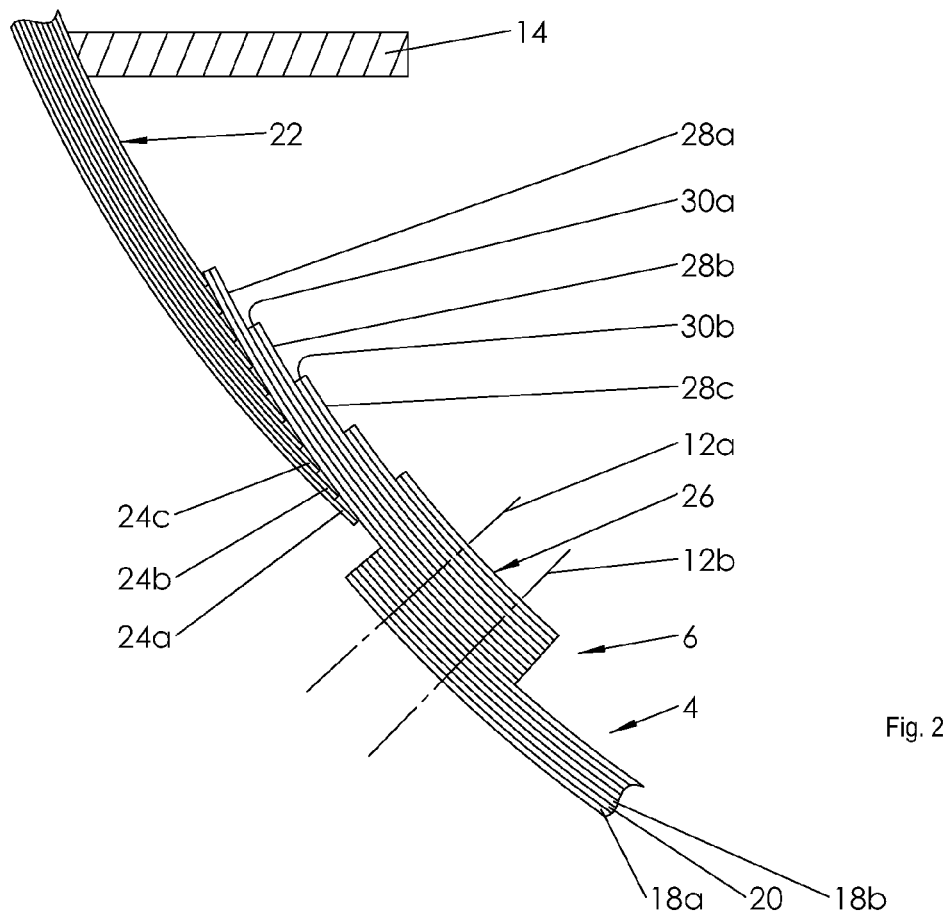

SHEET ENTITY AND AN AIRCRAFT FUSELAGE WITH A SHEET ENTITY OF THIS TYPE

CROSS-REFERENCES TO RELATED APPLICATIONS

This application claims the benefit of the U.S. Provisional Application No. 61/392,512, filed on Oct. 13, 2010, and of the German patent application No. 10 2010 048 365.6 filed on Oct. 13, 2010, the entire disclosures of which are incorporated herein by way of reference.

BACKGROUND OF THE INVENTION

The invention concerns a sheet entity, in particular for use as a skin plate for an aircraft fuselage and also an aircraft fuselage with at least one sheet entity of this type.

Civil aircraft are conventionally manufactured with a fuselage made from metal skin panels. In recent times, however, composite materials such as aluminum laminates with a multiplicity of sandwich-type bonded aluminum layers and glass fiber layers (GLARE®) have been deployed for purposes of optimizing the fuselage. A current example is the Airbus A380 wide-body aircraft, whose outer fuselage shell comprises an aluminum laminate of this type. Likewise carbon fiber-reinforced plastic laminates (CFRPs or CFCs) are used for purposes of optimizing the fuselage. Both the plastic laminate and also the aluminum laminate are distinguished by a lower weight compared with a conventional metal skin panel, wherein the aluminum laminate in particular has a higher fatigue strength and a lower crack propagation rate than a conventional metal skin panel. Furthermore the aluminum laminate is comparatively robust with regard to mechanical damage and has high acoustic insulation and thermal insulation properties. It is therefore an endeavor to manufacture the fuselage from a multiplicity of skin panels with different types of laminate. However, the connection of the plastic laminates with the aluminum laminates is problematical, inasmuch as in the event of contact of the aluminum layers with the carbon fiber layers, the aluminum layers tend to corrode, such that any direct contact between these two materials must be avoided at all costs. For the solution of this problem it is proposed by the applicant in the German patent application DE 10 2007 046 478 A1 to insert a solid titanium profile into the respective longitudinal seam region of the carbon laminates and to insert a solid aluminum profile into the respective longitudinal seam region of the aluminum laminates; these profiles are then connected with one another by means of friction welding. As a result of the solid metallic longitudinal seam regions, however, the loads and stresses in the laminates are not optimally distributed over the fuselage, so that stress peaks can occur in the region of the inserts. Furthermore the mechanical properties of the laminates alter in the edge region. In addition an insert of this type is relatively cost-intensive to manufacture.

SUMMARY OF THE INVENTION

The object of the present invention is to create a sheet entity, in particular for use as a skin panel for an aircraft fuselage, which removes the above-cited disadvantages and makes possible an optimal stress profile between a carbon laminate and an aluminum laminate, and also an aircraft fuselage, which has an optimal connection between a carbon fiber laminate and an aluminum laminate.

An inventive sheet entity, in particular for use as a skin panel for an aircraft fuselage, has a plastic laminate with a multiplicity of carbon fiber layers, which are embedded into a plastic matrix. Furthermore, the sheet entity has a metal-based edge region, which in accordance with the invention is constituted from a metal laminate with a multiplicity of aluminum sheets, which in each case are connected with one another by means of a resin layer accommodating at least one glass fiber layer, wherein the plastic laminate and the aluminum laminate form an overlap joint based on an electrically insulating adhesive bond, and in the region of the overlap joint are stepped back by layers. The inventive solution allows the connection of the sheet entity with an aluminum laminate, wherein by means of the stepping back by layers of the plastic laminate and also the metal laminate, the stiffness of the plastic laminate is transferred layer-by-layer into the metal laminate. The sheet entity thus has identical or nearly identical mechanical properties over its whole surface. Moreover an overlap joint is simple to manufacture in production engineering terms and makes possible a reliable compensation of component and assembly tolerances.

In one preferred example of embodiment the adhesive bond is executed as a resin layer containing at least one glass fiber layer. In this manner the adhesive bond quasi-corresponds to an adhesive layer of the metal laminate, so that no additional materials are necessary for purposes of connecting the plastic laminate with the metal laminate.

In one example of embodiment the carbon fiber layers of the plastic laminate are stepped down in the direction of the metal laminate. By this means the non-stepped back carbon fiber layer serves as an outer layer of the sheet entity, as a result of which on the one hand the stepped-back carbon fiber layers are protected from damage. On the other hand, a sheet entity of this type has a step-free or nearly step-free outer layer, so that when using the inventive sheet entity as a skin shell no additional aerodynamic turbulence is created in addition to the established aerodynamic turbulence.

The aluminum sheets and glass fiber layers of the metal laminate are preferably stepped down in a direction towards the plastic laminate. By this means the adhesive bond is formed between the stepped-back carbon fiber layers, and the non-stepped back aluminum sheet, so that an optimal introduction or transfer of stress is achieved between the plastic laminate and the metal laminate. Furthermore in this manner no inserts are introduced into the plastic laminate or the metal laminate, so that the step-downs or step-backs can be embodied in a relatively generous manner.

The plastic laminate and the metal laminate can have, at least approximately, the same wall thickness, wherein they are stepped back such that the wall thickness in the region of the overlap joint corresponds approximately to the wall thickness of the plastic laminate or the metal laminate.

An inventive aircraft fuselage has at least one fuselage cell with a multiplicity of skin shells, which in each case are connected with one another via a longitudinal seam, wherein the plastic laminate and the aluminum laminate are connected by means of an inventive sheet entity with a plastic laminate and a longitudinal seam region made from a metal laminate.

In one preferred example of embodiment the aluminum laminate is a lower shell, the plastic laminate is an upper shell, and the inventive sheet entities are in each case a side shell, or are located in a side-shell and thus constitute, at least in some sections, a side shell. As a result of the arrangement of the aluminum laminate in the underfloor region of the aircraft fuselage the fuselage region is designed in a relatively robust manner, which in the event of a crash landing is subjected to particularly large forces and in which collisions can occur on a runway with ground handling vehicles, loading and unloading vehicles as well as with tanker vehicles.

The longitudinal seam region, as viewed in the vertical direction of the aircraft fuselage, is preferably arranged underneath a passenger floor.

Other advantageous examples of embodiment of the invention are the subject of further subsidiary claims.

BRIEF DESCRIPTION OF THE DRAWINGS

In what follows a preferred example of embodiment of the present invention is elucidated more detail with the aid of schematic representations. Here:

FIG. 1 shows a cross-section through a fuselage cell of an inventive aircraft fuselage, FIG. 2 shows a detailed representation of a longitudinal seam region from FIG. 1.

DETAILED DESCRIPTION OF THE PREFERRED EMBODIMENTS

Figure 3:
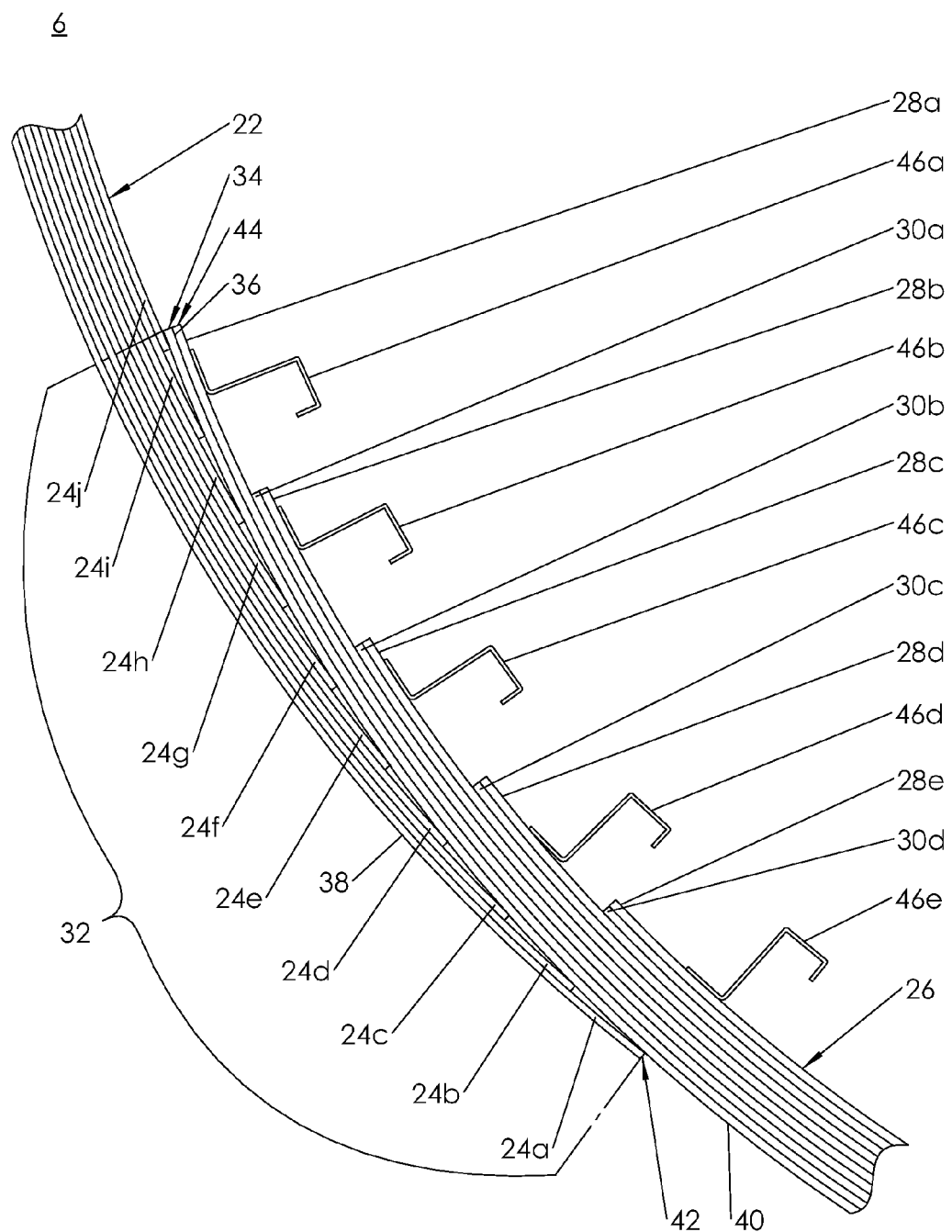
FIG. 3 shows a detailed representation of an inventive sheet entity shown in section in FIG. 2.

In the figures the same design elements have the same reference numbers, wherein where there is a plurality of the same design elements in one figure, in the interests of clarity just some of the elements are provided with a reference number.

In accordance with the cross-sectional representation in FIG. 1 an inventive fuselage cell 1 of an aircraft is constituted from an upper shell 2, a lower shell 4 as well as two side shells or side sheet entities 6, 8. The skin shells 2, 4, 6, 8 are connected with one another by means of longitudinal seams 10a, 10b, 10c, 10d in the longitudinal direction of the aircraft. The connection takes place in each case by means of rivets 12a, 12b, as indicated in FIG. 2.

Furthermore, a floor frame 14 is indicated in the fuselage cell 1, for purposes of accommodating a cabin floor, which is supported on stiffening elements, not shown, via vertical struts 16a, 16b, on the lower shell 4, and, as viewed in the direction of the aircraft vertical axis z is positioned above the lower shell-side longitudinal seams 10b, 10c.

The upper shell 2 is a plastic laminate and comprises a multiplicity of carbon fiber layers, which are embedded into a plastic or resin matrix.

The lower shell 4 is an aluminum laminate, such as GLARE®, which in accordance with FIG. 2 has a multiplicity of aluminum sheets 18a, 18b, which are bonded with one another by means of an adhesive layer, in which in each case at least one glass fiber layer 20, is arranged.

The side shells 6, 8 have in each case a section to be connected with the upper shell 2, which is embodied in a similar manner to the upper shell 2 as a plastic laminate 22 with a multiplicity of carbon fiber layers 24a, 24b, 24c, which are embedded in a plastic matrix that is not numbered. In accordance with the invention the side shells 6, 8 have a section to be connected with the lower shell 4, which is embodied in a similar manner to the lower shell 4 as a metal laminate 26 with a multiplicity of aluminum foils or aluminum sheets 28a, 28b, 28c, which in each case are separated from one another by at least one glass fiber mat or glass fiber layer 30a, 30b, and in each case are connected with one another by means of an adhesive layer accommodating at least one glass fiber layer 30a, 30b.

The side shells 6, 8 thus have, at least in the regions of the upper longitudinal seams 10a and 10d, in each case a carbon fiber-based plastic laminate 22, and in the regions of the lower longitudinal seams 10b and 10c, an aluminum-based metal laminate 26 and thus the same materials as the upper shell 2 and lower shell 4 that are to be connected with them, so that in the side connection of the skin shells 2, 4, 6, 8, as shown for example in FIG. 2 in terms of the very much simplified representation of riveting 12a, 12b of the lower shell 4 with the metal laminate 26, no negative reactions such as corrosion are to be feared, because the material properties in the longitudinal seam regions to be connected are the same.

In accordance with the detailed representation of the region of the lower longitudinal seam 10c of the side shell 6 in FIG. 3 the plastic laminate 22 and the metal laminate 26 form a large surface area overlap joint 32. Here the plastic laminate 22 and the metal laminate 26 are bonded with one another by means of an adhesive bond 34 based, for example, on an epoxy resin, in which at least one glass fiber mat 36 is arranged, and are electrically insulated from one another. The adhesive bond 34 allows, for example, an equalization of thermal stresses between the plastic laminate 22 and the metal laminate 26, and thus prevents, for example in contrast to a riveted joint, the introduction of stresses into the overlap joint 32.

The carbon fiber layers 24b to 24j and also the aluminum foils 28b to 28e and the glass fiber layers 30a to 30d are in each case in the radial direction as viewed from outside to inside are stepped back by layers relative to the adjacent ply or layer such that in the region of the overlap joint 32 the plastic laminate 22 and the metal laminate 26 run out in opposite circumferential directions in an approximately wedge-shaped manner. Here the plastic laminate 22 and the metal laminate 26 are dimensioned, i.e., have numbers of carbon layers 24a to 24j, aluminum foils 28a to 28d and glass fiber layers 30a to 30d, such that the side shells 6, 8 over the whole of their cross-section, and thus in the region of the overlap joint 32 also, have a constant or nearly constant wall thickness.

The non-stepped back carbon fiber layer 24a of the plastic laminate 22 forms an outer surface section 38 of the fuselage cell 1 and is bonded with the glass fiber mat 36, which forms an adjacent outer surface section 40. Accordingly the carbon fiber layers 24b to 24j are stepped down radially from the outside to the inside in the direction of the metal laminate 26. By means of this positioning of the plastic laminate 22 and the metal laminate 26 in the outer surface region 26 of the fuselage cell 1 only one step 42 is formed, and this is in fact at the point where the non-stepped back carbon fiber layer 24a runs out.

The non-stepped back aluminum foil 28a of the metal laminate 26 extends over the edge sections of the stepped-back carbon fiber layers 24b to 24j and is bonded by means of the adhesive layer 34 containing the glass fiber mat 36 with the carbon fiber layers, as a result of which only one step 44 is formed in the edge region of the non-stepped back aluminum foil 28a and thus only one step-change in stress between the plastic laminate 22 and the metal laminate 26. The aluminum foils 28b to 28e and glass fiber layers 30a to 30d are stepped down radially from the outside to the inside in a direction away from the plastic laminate 22 such that the thickness of the metal laminate 26 steps down in a direction towards the plastic laminate 22.

In an exemplary method for the manufacture of the inventive sheet entities 6, 8, HSS glass fiber mats and aluminum foils 28a to 28e of the alloy FR7475 are selected, are arranged in accordance with their stepping down, and are cured together with carbon fiber layers 24a to 24j, layered in accordance with their stepping down, in an autoclave at 175° C. to form the sheet entity 6, 8. Stringers 46a to 46e arranged in the region of the overlap joint 32 are bonded with the cured sheet entity 6, 8 in a second autoclave at 175° C. Alternatively the stringers 46a to 46e can also be attached to the sheet entity 6, 8 by means of titanium bolts or titanium rivets.

Disclosed is a sheet entity, in particular for use as a skin panel for an aircraft fuselage with a carbon fiber-reinforced plastic laminate and an aluminum-based metal laminate in the edge region, which are connected with one another by means of an adhesive bond, and thereby are electrically insulated from one another, and are stepped back by layers; also disclosed is a fuselage cell of an aircraft with at least one sheet entity of this type.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST

1 Fuselage cell
2 Upper shell
4 Lower shell
6 Side shell
8 Side shell
10a, b, c, d Longitudinal seam
12a, b Rivet
14 Cabin floor
16a, b Struts
18a, b Aluminum sheet
20 Glass fiber layer
22 Plastic laminate
24a to 24j Carbon fiber layer
26 Metal laminate
28a to 28e Aluminum foil
30a to 30d Glass fiber layer
32 Overlap joint
34 Adhesive bond
36 Glass fiber mat
38 Outer surface section
40 Outer surface section
42 Step
44 Step
46a to 46e Stringer

The invention claimed is:

1. A sheet entity with a plastic laminate made from a multiplicity of carbon fibre layers, which are embedded into a plastic matrix, and with a metal-based edge region, wherein the edge region comprises a metal laminate with a multiplicity of aluminum sheets, which are each connected with one another by means of a resin layer accommodating at least one glass fibre layer, wherein the plastic laminate and the metal laminate form an overlap joint based on an electrically insulating adhesive bond comprising an adhesive layer containing at least one glass fibre mat, and in the region of the overlap joint, the plastic laminate and the metal laminate are stepped back by layers, wherein the metal laminate comprises a non-stepped back foil, as an outermost layer of the metal laminate, extending over and positioned adjacent all edge sections of the stepped back layers of the plastic laminate and the adhesive bond is disposed between and bonds the stepped back carbon fibre layers of the plastic laminate to the metal laminate only at said non-stepped back foil of the metal laminate, such that the stepped back layers of the metal laminate are on a side of the non-stepped back foil that is opposite to the side having said adhesive bond.

2. The sheet entity in accordance with claim 1, wherein the carbon fibre layers of the plastic laminate are stepped down in the direction of the metal laminate.

3. The sheet entity in accordance with claim 2, wherein the aluminum sheets and glass fibre layers are stepped down in a direction towards the plastic laminate.

4. The sheet entity in accordance with claim 1, wherein the plastic laminate and the metal laminate have at least approximately the same wall thickness, and are stepped back such that a wall thickness in the region of the overlap joint corresponds approximately to the wall thickness of one of the plastic laminate and the metal laminate.

5. An aircraft fuselage, with at least one fuselage cell with a multiplicity of skin shells, which are each connected with one another by a longitudinal seam, with one skin shell of a plastic laminate with a multiplicity of carbon fibre layers, which are embedded into a plastic matrix, and with one skin shell of an aluminum laminate with a multiplicity of aluminum sheets, each of which are connected with one another by means of a resin layer accommodating at least one glass fibre layer, wherein the plastic laminate and the aluminum laminate are connected with one another by means of the sheet entity, in accordance with claim 1.

6. The aircraft fuselage in accordance with claim 5, wherein the aluminum laminate is a lower shell, the plastic laminate is an upper shell and the sheet entities are side shells, at least in some regions of the fuselage.

7. The aircraft fuselage in accordance with claim 6, wherein the longitudinal seams of the lower shell, as viewed in the vertical direction of the fuselage cell, are arranged underneath a cabin floor.

8. The sheet entity in accordance with claim 1, wherein said sheet entity is part of a skin panel of an aircraft fuselage.

* * * * *